United States Patent Office 3,484,446
Patented Dec. 16, 1969

3,484,446
1-[3-(4-FLUOROBENZOYL)PROPYL] - AND 1 - [1,1-ETHYLENEDIOXY - 1 - (4 - FLUOROPHENYL)-4-BUTYL]-4-PIPERIDYL CARBAMATES
John H. Biel, Jorge P. Li, Robert George Stein, and John F. Hoops, Milwaukee, Wis., assignors to Aldrich Chemical Company, Inc., Milwaukee, Wis., a corporation of Wisconsin
No Drawing. Filed Jan. 16, 1967, Ser. No. 609,339
Int. Cl. C07d 29/30, 99/04; A61k 27/00
U.S. Cl. 260—294.3                                   15 Claims

ABSTRACT OF THE DISCLOSURE

Compounds of the formula

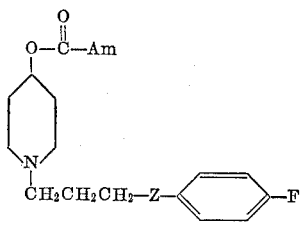

in which Am and Z are as defined below, which are useful as tranquilizers and hypotensive agents in mammals, and processes for the preparation thereof.

---

It is an object of the present invention to provide a new class of therapeutic compounds. It is another object of the present invention to provide novel compounds having hypotensive and tranquilizing activity. It is a further object of the present invention to provide a process for preparing the novel therapeutic compounds. It is still a further object of the present invention to provide a novel method of lowering blood pressure and producing tranquility in mammals.

These and other objects which may appear as the specification proceeds are achieved by this invention which comprises the provision of compounds selected from the group consisting of compounds having the following formula (I)

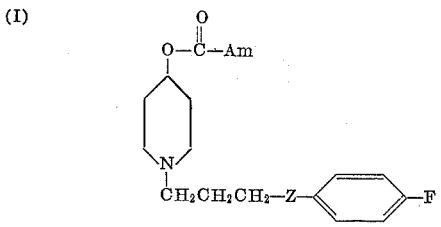

wherein Am is a member selected from the group consisting of amino, (lower)alkylamino, (lower)alkenylamino, (lower)alkynylamino, cyclopropylamino, cyclobutylamino, cyclobutylamino, cyclopentylamino, cyclohexylamino, cycloheptylamino, 2-norbornylamino, 3-quinuclidylamino, 1-adamantylamino, morpholino, pyrrolidino, nortropino, norpseudotropino, 4 - (lower)alkylpiperazino, 4 - phenylpiperazino, 4 - (lower)alkoxyphenylpiperazino, piperidino, hydroxypiperidino, 1,2,3,6-tetrahydropyridino and a radical of the formula

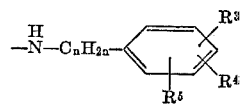

wherein $n$ is a whole integer from 0 to 5, and $R^3$, $R^4$ and $R^5$ each represent a member selected from the group consisting of hydrogen chloro, bromo, iodo, fluoro, trifluoromethyl, (lower)alkyl, (lower)alkoxy, di(lower)alkylamino, phenyl, phenoxy and benzyl. Preferably $R^4$ and $R^5$ are both hydrogen. Z is a radical selected from the group consisting of

and

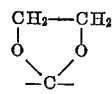

and the pharmaceutically acceptable nontoxic salts thereof.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like. Such salts are prepared by conventional methods.

The term "(lower)alkyl" as used herein means both straight and branched chain aliphatic hydrocarbon radicals having from 1 to 8 carbon atoms, such as methyl, ethyl, propyl, isopropyl, butyl, isobutyl, t-butyl, amyl, hexyl, 2-ethylhexyl, etc.

The term "(lower)alkenylamino" as used herein means both straight and branched chain alkenylamino radicals containing from 2 to 8 carbon atoms, e.g., ethenylamino, allylamino, 1-propenylamino, 1-butenylamino, 3-butenylamino, 2 - methyl-1-propenylamino, 3-pentenylamino, 1-hexenylamino, 7-octenylamino, etc.

The term "(lower)alkynylamino" as used herein means both straight and branched chain alkynylamino radicals containing from 2 to 8 carbon atoms, e.g. ethinylamino, propargylamino, 1-butinylamino, 2-butinylamino, 1,1-dimethylpropargylamino, 1-pentinylamino, 1-heptinylamino, etc.

Similarly, where the term "(lower)" is used as part of the description of another group, e.g., "(lower)alkoxy," it refers to the alkyl portion of such group which is therefore as described in connection with "(lower)alkyl."

Thus, the compounds of this invention have the formulae (II)

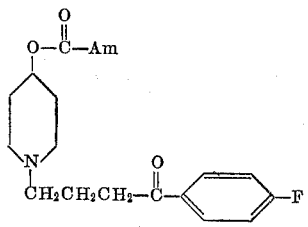

(III)
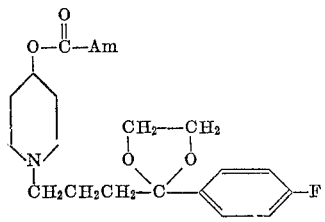

wherein Am is as described above.

The preferred compounds of this invention have the formulae (IV)
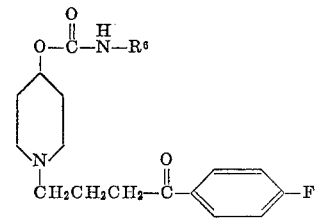

(V)
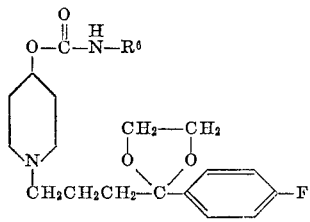

wherein $R^6$ is hydrogen or (lower)alkyl.

Some of the compounds of the present invention contain an asymmetric carbon atom, and thus normally occur as a racemic mixture of the two optical isomers. Both isomers are active, and both of these isomers and mixtures thereof are included within the scope of the present invention. The individual isomers are prepared in pure form from a racemic mixture by resolution with an optically active acid, e.g. comphorsulfonic acid, tartaric acid, by the procedure used on similar amines, e.g. α-phenethylamine, amphetamine.

The compounds of this invention possess hypotensive activity and tranquilizing activity making them useful for the treatment of hypertension and for inducing tranquility in mammals.

Tests of the compounds of the present invention for hypotensive activity were carried out in rats. When for example 4-(4-N-butylcarbamoxy)-p-fluorobutyrophenone was administered orally in rats at dosages of 10 mgm./kg., a reduction in arterial blood pressure was obtained of greater than 10%. This indicated that this compound is a hypotensive agent.

The tranquilizing activity of the compounds of this invention is indicated by their ability when administered to rats to block a conditioned response in the usual test, in which the rats are trained to climb a pole when a buzzer is sounded in order to avoid a subsequent electric shock to their feet if they remain on the floor of the cage. For example, when 1-[3-(4-fluorobenzoyl)propyl]-4-piperidyl carbamate was administered p.o. in rats, it was effective at a dose as low as 10 mgm./kg.

The compounds of this invention are prepared as exemplified below by reacting an N-substituted-4-piperidinol of the formula (VI)
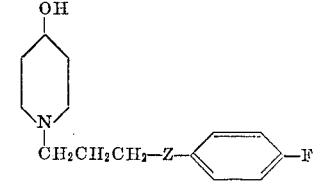

wherein Z is as described above, with phosgene to form the chloroformate hydrochloride to the formula (VII)
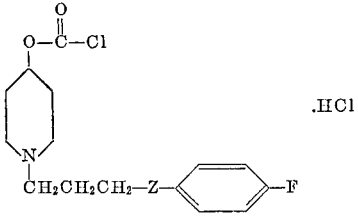

wherein Z is as described above. Preferably the phosgene is used in the form of a saturated ethereal solution and the reaction is carried out in the presence of a nonreactive solvent such as benzene, toluene, xylene and the like, and at room temperature. The chloroformate of formula VIII, either in the form of a crude mixture or the pure compound, is reacted with an amine of the formula (VIII)        AmH wherein Am is as described above. The reaction is preferably carried out in the presence of a nonreactive solvent, e.g. benzene, toluene, xylene and the like, and in the presence of an acid acceptor, eg., triethylamine. In the case of gaseous amines, such as methyl or ethylamine, the amine is passed into a suspension of the chloroformate hydrochloride in for example, benzene.

The compounds of the present invention wherein Am is amino, (lower)alkylamino, (lower)alkenylamino, (lower)alkynylamino, cyclopropylamino, cyclobutylamino, cyclopentylamino, cyclohexylamino, cycloheptylamino or a radical of the formula (IX)
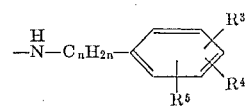

wherein $n$, $R^3$, $R^4$ and $R^5$ are as described above, may also be prepared, as exemplified below, by reaction of a N-substituted-4-piperidinol of formula VI with an isocyaante of the formula (X)        R—N=C=O wherein R is hydrogen, (lower)alkyl, (lower)alkenyl. (lower)alkynyl, cyclopropyl, cyclobutyl, cyclopentyl, cyclohexyl, cycloheptyl or a radical of the formula (XI)
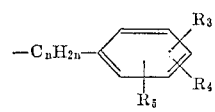

wherein $n$ $R^3$, $R^4$ and $R^5$ are as described above, in the presence of the nonreactive solvent, e.g., benzene and preferably at reflux temperature.

The starting materials, Formula VI, for the preparation of the compounds of this invention are prepared as exemplified below by reacting 4-hydroxypiperidine with a halide of the formula (XII)
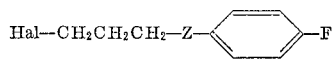

wherein Hal is chloro, bromo or iodo and Z is as described above, in an inert solvent such as benzene, toluene, or xylene. Aprotic solvents, such as dimethylsulfoxide or dimethylformamide, are to be avoided in that their use may result in the fluorine atom also being replaced by the 4-hydroxypiperidine. The halides used in the procedure are described in the literature, e.g., Belgian Patent No. 660,763.

The compounds of this invention may be administered as the free bases or in the form of their nontoxic addition salts. They may be compounded and formulated into pharmaceutical prepaartions in the unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The compounds of this invention when administered orally or parenterally in an effective amount are effective in the treatment of hypertension and for inducting tranquility in mammals.

The following examples are intended to illustrate the invention described herein without unduly restricting it.

EXAMPLE 1

Preparation of 1-[3-(4-fluorobenzoyl)propyl]-4-piperidinol

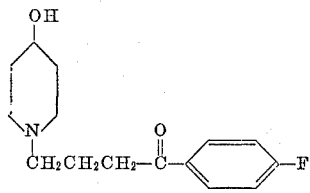

A mixture of 4-piperidinol (25.2 g., 0.25 mole), 4-chloro-4'-fluorobutyrophenone (80–85% purity; 62.5 g., ca. 0.25 mole), sodium bicarbonate (25 g., 0.3 mole), and toluene (200 ml.) was refluxed for 24 hours. Water (ca. 5.0 ml.) was collected. The mixture was stirred and chilled in ice. The liquid phase was decanted, filtered, and evaporated to dryness in vacuo, and the residue was recrystallized from acetone-n-heptane to give 1-[3-(4-fluorobenzoyl)propyl]-4-piperidinol in the form of almost white crystals, 47.9 g., M.P. 83.5–85.0° C.

EXAMPLE 2

Preparation of 1-[3-(4-fluorobenzoyl)propyl]-4-piperidyl carbamate

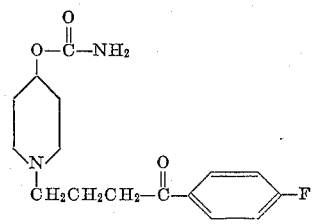

To a stirred, ice-cooled, saturated ethereal solution of phosgene (200 ml.), a solution of 1-[3-(4-fluorobenzoyl)propyl]-4-piperidinol (6.0 g., 20 mmoles) in toluene (100 ml.) was added slowly. After the mixture was stirred at room temperature for one hour, concentrated ammonium hydroxide (ca. 70 ml.) was added and mixed well. The upper organic layer was separated. The aqueous phase was extracted with dichloromethane (2× 50 ml.). The organic layer and extracts were combined, washed with water, dried over magnesium sulfate and evaporated to dryness in vacuo, giving a residue in the form of a white powder (5.2 g.). Recrystallization from methylene chloride-carbon tetrachloride afforded the pure product, 1-[3-(4-fluorobenzoyl)propyl]-4-piperidyl carbamate, M.P. 152–154° C.

$\lambda_{max.}^{KBr}$ 3.0 (N—H)

5.8 (carbamate C=O), 5.9μ aromatic C=O).

*Analysis.*—Calc'd for $C_{16}H_{21}FN_2O_3$: C, 62.32%; H, 6.86%; N, 0.09%. Found: C, 62.32%; H, 6.76%; N, 9.14%.

EXAMPLE 3

Preparation of 4-chloro-1,1-ethylenedioxy-1-(4-fluorophenyl)butane

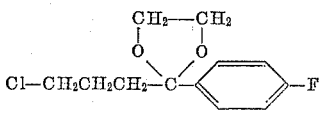

A mixture of ethyleneglycol (62 g., 1.0 mole), p-toluene-sulfonic acid monohydrate (8.0 g., 42 mmoles), and benzene (1.0 liter) was refluxed for 18 hours and water plus ethyleneglycol (4.5 ml.) was collected. 4-chloro-4'-fluorobutyrophenone (80–85% purity, 100 g., 0.4–0.44 mole) was added and reflux continued for 24 hours. More water plus ethyleneglycol (16 ml.) was collected. The reaction solution was washed with 5% aqueous sodium bicarbonate (3× 250 ml.), dried, and evaporated in vacuo. The reddish-brown, oily residue was distilled. The product, 4-chloro-1,1-ethylenedioxy-1-(4-fluorophenyl)butane, was collected at 141–154° C. (6–7 mm.), yield 118 g. Some of the ketal was redistilled for analytical purposes, B.P. 148.5° C. (4–5 mm.), $n_D^{19.5}$ 1.5075.

*Analysis.*—Calc'd for $C_{12}H_{14}ClFO_2$: C, 58.90%; H, 5.77%; Cl, 14.49%. Found: C, 59.70%; H, 5.97%; Cl, 14.33%.

EXAMPLE 4

Preparation of 1,1-ethylenedioxy-1-(4-fluorophenyl)-4-(4-hydroxypiperidino)butane

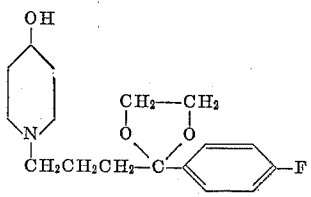

A mixture of 4-piperidinol (4.75 g., 50 mmoles), 4-chloro-1,1-ethylenedioxy-1-(4-fluorophenyl)butane (12.2 g., 50 mmoles), anhydrous sodium carbonate (10.6 g., 0.1 mole), and toluene (25 ml.) was refluxed for 20 hours. Evaporation of the filtrate afforded an orange, viscous oily residue, which was purified by distilling on a Kugelrohr apparatus. The product, 1,1-ethylenedioxy-1-(4-fluorophenyl)-4-(4-hydroxypiperidino)butane, was collected at 154° C. and 0.05–0.1 mm., as a pale, clear highly viscous liquid, which crystallized on standing as white needles, yield, 11.9 g. A small amount of the solid was recrystallized from benzene-n-heptane, M.P. 79–81° C.

$\lambda_{max.}^{CCl_4}$ 3μ(OH); $\lambda_{max.}^{Nujol}$ 3.15μ(OH)

*Analysis.*—Calc'd for $C_{17}H_{24}FNO_3$: C, 66.0%; H, 7.82%; N, 4.53%. Found: C, 65.84%; H, 7.69%; N, 4.64%.

EXAMPLE 5

Preparation of 1-[1,1-ethylenedioxy-1-(p-fluorophenyl)-4-butyl]-4-piperidyl carbamate

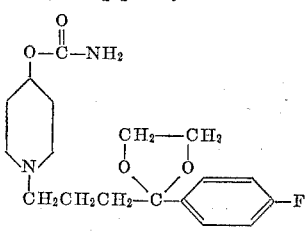

A solution of 1,1-ethylenedioxy-1-(4 - fluorophenyl)-4-(4-hydroxypiperidino)butane (9 g., 0.0271 mole) in dry benzene (100 ml.) was added slowly to a saturated benzene solution of phosgene. The yellow solution was stirred for three hours. A white solid remained after concentrating the reaction solution in vacuo. The crue chloroformate hydrochloride, 1 - [1,1 - ethylene-dioxy-1-(p-fluorophenyl)-4-butyl] - 4 - piperidyl chloroformate hydrochloride, was dissolved in anhydrous benzene (300 ml.). After introducing anhydrous ammonia for 45 minutes, the reaction mixture was stirred for 2 hours, filtered and concentrated in vacuo. The white solid residue was recrystallized from anhydrous benzene several times, giving the pure product, 1 - [1,1 - ethylene - dioxy-1-(p-fluorophenyl)-4-butyl]-4-piperidyl carbamate as a white crystalline solid (2.3 g.), M.P. 115–117° C.;

$\lambda_{max.}^{Nujol}$ 3-3.2 (doublet, $NH_2$), 5.88μ (broad, C=O)

*Analysis.*—Calc'd for $C_{18}H_{25}FN_2O_4$: C, 61.34%; H, 7.14%; N, 7.95%. Found: C, 61.38%; H, 7.15%; N, 8.20%.

EXAMPLE 6

Preparation of 1-[3-(4-fluorobenzoyl)-propyl]-4-piperidyl chloroformate hydrochloride

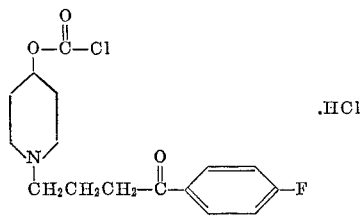

In a three-necked flask equipped with dropping funnel, a Hershberg stirrer, and a gas inlet tube, toluene (200 ml.) was placed and cooled in ice. Phosgene gas was introduced for 15 minutes. To the resulting cold phosgene solution, a suspension of 1 - [3 - (4-fluorobenzoyl)propyl]-4-piperidinol (5.3 g., 20 mmoles) in toluene (50 ml.) was added portion-wise with stirring. After the completion of addition, the mixture was stirred for 18 hours. The white precipitates were collected, M.P. 127–128° C. (dec.).

$\lambda_{max.}^{Nujol}$ ca. 4 (+NH)

5.65 (chloroformate C=O), 5.95μ (aromatic C=O). A second crop of the compound was obtained from the filtrate. Total yield: 6.2 g. of 1-[3-(4-fluorobenzoyl)-propyl]-4-piperidyl chloroformate hydrochloride.

EXAMPLE 7

Preparation of 1-[3-(4-fluorobenzoyl)-propyl]-4-piperidyl carbanilate

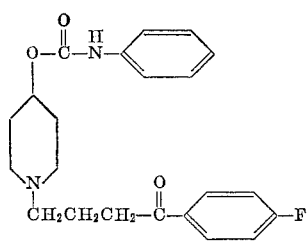

A mixture of 1 - [3 - (4 - fluorobenzoyl)propyl] - 4-piperidinol (3.0 g., 10 mmoles), phenylisocyanate (1.5 g., 12.6 mmoles) and anhydrous benzene was refluxed on a steam bath for 30 minutes. The solvent was removed in vacuo and the solid residue was dissolved in dichloromethane (50 ml.), washed with water (15 ml.), dried over magnesium sulfate and evaporated to dryness in vacuo. The residue was recrystallized from dichloromethane - n - heptane to give 1-[3-(4-fluorobenzoyl)propyl]-4-piperidyl carbanilate as an almost white powder, M.P. 113.0–113.5° C.

$\lambda_{max.}^{Nujol}$ 2.99 (N—H), 5.87 (carbamate C=O), 5.96μ (aromatic C=O); $\lambda_{max.}^{CH_2Cl_2}$ 2.92; 5.78, 5.92μ (4.5 g., quantitative yield).

*Analysis.*—Calc'd for $C_{22}H_{25}FN_2O_3$: C, 67.73%; H, 6.55%; N, 7.29%. Found: C, 68.73%; H, 6.12%; N, 6.55%.

EXAMPLE 8

Preparation of 1-[3-(4-fluorobenzoyl)-propyl]-4-piperidyl N-methylcarbamate

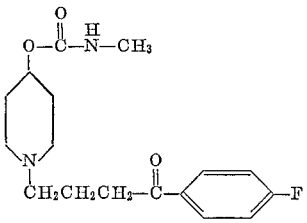

1 - [3 - (4 - fluorobenzoyl)propyl]-4-piperidyl chloroformate hydrochloride (5 g., 0.0137 mole) was finely ground and suspended in anhydrous benzene (300 ml.). Methyl amine gas was introduced at room temperature for 4 minutes. After completion of the addition, the reaction mixture was stirred at room temperature overnight, washed with water (50 ml.), dried over anhydrous magnesium sulfate and filtered. Concentration of the filtrate afforded an oil which crystallized on standing. Recrystallization from ethyl-acetate-petroleum ether yielded 4 g. of the product, 1 - [3 - (4-fluorobenzoyl)propyl]-4-piperidyl N-methylcarbamate, M.P. 97–98° C.

$\lambda_{max.}^{Nujol}$ 2.98μ (NH), 5.93μ (C=O)

*Analysis.*—Cal'd for $C_{17}H_{23}FN_2O_3$: C,63.33%; H, 7.16%; N, 8.69%. Found: C, 63.46%; H, 6.74%; N, 8.51%.

EXAMPLE 9

Preparation of 4-{1-[3-(4-fluorobenzoyl)propyl]-4-piperidyloxycarbonyl}-morpholine

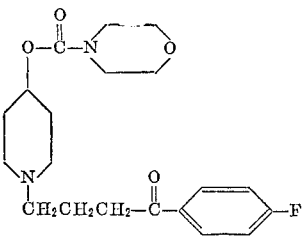

A mixture of 1-[3-(4-fluorobenzoyl)propyl]-4-piperidyl chloroformate hydrochloride (3.65 g., 0.01 mole), morpholine (1.74 g., 0.02 mole) and anhydrous benzene (250 ml.) was stirred for 1 hour and then refluxed for 2 hours. The reaction mixture was stirred overnight at room temperature, washed with water, drived over anhydrous magnesium sulfate and filtered. Evaporation of the filtrate afforded an oily residue, which was purified by distilling on a Kugelrohr apparatus. The product, 4-{1-[3-(4-fluorobenzoyl)propyl] - 4 - piperidyloxycarbonyl}morpholine, was collected at 175–180° C. and 0.4 mm. as a light yellow oil, yield: 3.1 g.

*Analysis.*—Calc'd. for $C_{20}H_{27}FN_2O_4$: C, 63.47%; H, 7.19%; N, 7.40%. Found: C, 63.41%; H, 7.38%; N, 7.14%.

EXAMPLE 10

Preparation of 1-[3-(4-fluorobenzoyl)-propyl]-4-piperidyl N-α-naphthylcarbamate

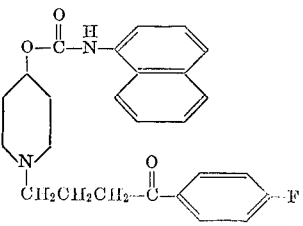

A mixture of 1-[3-(4-fluorobenzoyl)propyl]-4-piperidinol (2.65 g., 0.01 mole), 1-naphthylisocyanate (1.69 g., 0.01 mole) and anhydrous benzene (200 ml.) was refluxed on a steam bath for 2 hours. The solvent was removed in vacuo leaving a yellow oil which crystallized on cooling and scratching. The solid was recrystallized from ethyl acetate-petroleum ether (3×), giving 4.0 g. of the product, 1-[3-(4-fluorobenzoyl)propyl]-4-piperidyl N-α-naphthylcarbamate, as a white solid, M.P. 133–134° C.

Analysis.—Calc'd. for $C_{26}H_{27}FN_2O_3$: C, 71.87%; H, 6.72%; N, 6.95%. Found: C, 71.90%; H, 6.39%; N, 6.60%.

EXAMPLE 11

Preparation of 1-[3-(4-fluorobenzoyl)propyl]-4-piperidyl N-allylcarbamate

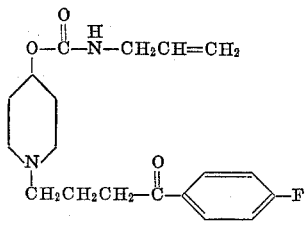

A mixture of 1-[3-(4-fluorobenzoyl)propyl]-4-piperidyl chloroformate hydrochloride (3.65 g., 0.01 mole), and allylamine (1.71 g., 0.03 mole) was stirred at room temperature for 12 hours. The mixture was filtered, washed with water, dried over anhydrous magnesium sulfate and again filtered. Concentration of the filtrate afforded an oil which solidified on standing. Recrystallization twice from methylene chloride-petroleum ether yielded 3.2 g. of the product, 1-[3-(4-fluorobenzoyl)propyl]-4-piperidyl N-allylcarbamate, M.P. 93.5–94° C.

Analysis.—Calc'd. for $C_{19}H_{25}FN_2O_3$: C, 65.39%; H, 7.23%; N, 8.04%. Found: C, 65.57%; H, 7.22%; N, 7.90%.

EXAMPLE 12

Preparation of 1-[3-(4-fluorobenzoyl)propyl]-4-piperidyl N-m-chlorophenylcarbamate

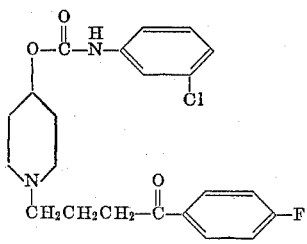

A mixture of 1-[3-(4-fluorobenzoyl)propyl]-4-piperidinol (2.65 g., 0.01 mole), and m-chlorophenylisocyanate (1.53 g., 0.01 mole) was refluxed for 2 hours. Anhydrous benzene (250 ml.) was added and the mixture refluxed for an additional 2 hours. The solvent was removed in vacuo leaving an oil which crystallized on cooling. Recrystallization twice from ethyl acetate yielded 3.85 g. of the product, 1-[3-(4-fluorobenzoyl)propyl]-4-piperidyl N-m-chlorophenylcarbamate, M.P. 125–126° C.

Analysis.—Calc'd. for $C_{22}H_{24}ClFN_2O_3$: C, 63.07%; H, 5.77%; N, 6.68%. Found: C, 63.12%; H, 6.13%; N, 6.63%.

EXAMPLE 13

Preparation of 1-[3-(4-fluorobenzoyl)propyl]-4-piperidyl N-p-anisylcarbamate

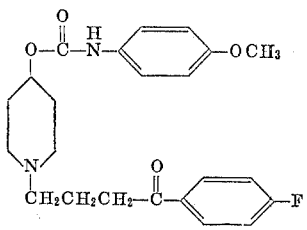

A mixture of 1-[3-(4-fluorobenzoyl)propyl]-4-piperidinol (2.65 g., 0.01 mole), p-methoxyphenylisocyanate (1.49 g., 0.01 mole) and anhydrous benzene (150 ml.) was refluxed for 2 hours. The solvent was removed in vacuo leaving an oil which crystallized on cooling. Recrystallization from ethyl acetate yielded 3.8 g. of the product, 1-[3-(4-fluorobenzoyl)propyl]-4-piperidyl N-p-anisylcarbamate, M.P. 131.5–133° C.

Analysis.—Calc'd. for $C_{23}H_{27}FN_2O_4$: C, 66.64%; H, 6.56%; N, 6.76%. Found: C, 66.58%; H, 6.52%; N, 6.89%.

EXAMPLE 14

Preparation of 1-[3-(4-fluorobenzoyl)propyl]-4-piperidyl o-nitrocarbanilate

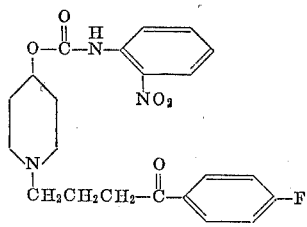

A mixture of 1-[3-(4-fluorobenzoyl)propyl]-4-piperidinol (2.65 g., 0.01 mole), o-nitrophenylisocyanate (1.64 g., 0.01 mole) and toluene (300 ml.) was refluxed for 2 hours. The solvent was removed in vacuo leaving an oil which crystallized on cooling. Recrystallization from ethyl acetate-petroleum ether yielded 2.8 g. of the product, 1-[3-(4-fluorobenzoyl)propyl]-4-piperidyl o-nitrocarbanilate, M.P. 71–72.5° C.

Analysis.—Calc'd. for $C_{22}H_{24}FN_3O_5$: C, 61.52%; H, 5.62%; N, 9.78%. Found: C, 61.93%; H, 5.82%; N, 9.45%.

EXAMPLE 15

Preparation of 4-(4-N-butylcarbamoxy)-p-fluorobutyrophenone

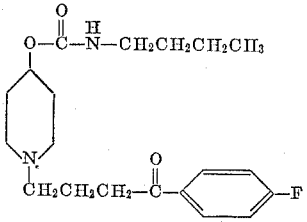

1-[3-(4-fluorobenzoyl)propyl]-4 - piperidinol (106 g., 0.40 mole) and 80 g. (0.80 mole) n-butyl isocyanate were charged to a 250 ml. three-necked flask and heated with stirring at 124–133° C. for 1 hour. The reaction mixture was then poured into 600 ml. of water and allowed to stand overnight. The slurry was then filtered and washed with water. The cake was dissolved in about 1 liter hot benzene, washed with 2× 0.2 liter of water and taken to dryness. The residue was dissolved in 0.6 liter of boiling heptane, filtered and cooled to room temperature. The solid mass was broken up with 0.3 liter of heptane, filtered and washed with 0.3 liter of heptane. The product, weighing 151.5 g. (M.P. 80.5–82.5° C.) was recrystallized from 800 ml. 1:1 benzene:heptane. A first crop (B), weighing 68.0 g. (M.P. 86–87° C.) was isolated. Second and third crops were combined and recrystallized from 600 ml. heptane. Crop 1 (41 g., M.P. 85.5–86° C.) (C) and crop 2 (M.P. 64.5–65.5° C.) (D) were obtained. B and C were blended to give 108 g. of the product, 4-(4-N-butylcarbamoxy)-p-fluorobutyrophenone, M.P. 87–89° C.

*Analysis.*—Calc'd for $C_{20}H_{29}N_2O_3$: C, 65.92%; H, 8.02%; N, 7.69%. Found: C, 65.92%; H, 8.03%; N, 7.68%.

EXAMPLE 16

Preparation of 1-{1-[3-(4-fluorobenzoyl)propyl]-4-piperidyloxycarbonyl}piperidine

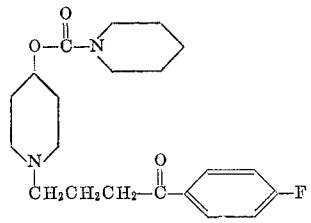

A mixture of 1-[3-(4-fluorobenzoyl)-propyl]-4-piperidyl chloroformate hydrochloride (3.65 g., 0.01 mole), piperidine (1.70 g., 0.020 mole) and anhydrous benzene were stirred for 12 hours. The mixture was washed with water, dried over anhydrous magnesium sulfate and concentrated to an oily residue. The residue was purified by distilling on a Kugelrohr apparatus. The product, 1-{1-[3-(4-fluorobenzoyl)propyl]-4-piperidyloxycarbonyl} - piperidine, was collected at 160–170° C., and 0.07 mm., as a yellow oil. Yield: 3.05 g.

*Analysis.*—Calc'd for $C_{21}H_{29}FN_2O_3$: C, 66.99%; H, 7.76%; N, 7.44%. Found: C, 66.94%; H, 7.84%; N, 7.24%.

EXAMPLE 17

When, in the procedure of Example 7, phenylisocyanate is replaced by an equal molar amount of 3-methylphenylisocyanate,
2-chlorophenylisocyanate,
4-chlorophenylisocyanate,
4-ethoxyphenylisocyanate,
3,4,5-trimethoxyphenylisocyanate,
4-nitrophenylisocyanate,
2,4-dichlorophenylisocyanate,
4-bromophenylisocyanate,
4-fluorophenylisocyanate,
4-trifluoromethylphenylisocyanate,
3-phenylphenylisocyanate,
4-phenoxyphenylisocanate,
4-benzylphenylisocyanate,
2-iodophenylisocyanate,
2-chloro-4-methylphenylisocyanate,
2,4,6-trichlorophenylisocyanate,
4-dimethylaminophenylisocyanate,
3-trifluoromethylphenylisocyanate,
2-trifluoromethylphenylisocyanate,
3,5-dimethylphenylisocyanate and
4-ethylphenylisocyanate, there are obtained, 1-[3-(4-fluorobenzoyl)propyl]-4-piperidyl N - 3 - methylphenylcarbamate, M.P. 104–106° C.,
1-[3-(4-fluorobenzoyl)propyl]-4-piperidyl N - 2 - chlorophenylcarbamate, M.P. 74–76° C.,
1-[3-(4-fluorobenzoyl)propyl]-4-piperidyl N - 4 - chlorophenylcarbamate, M.P. 135–137° C.,
1-[3-(4-fluorobenzoyl)propyl]-4-piperidyl N - 4 - ethoxyphenylcarbamate, M.P. 142–143° C.,
1-[3-(4-fluorobenzoyl)propyl]-4-piperidyl - N - 3,4,5 - trimethoxyphenylcarbamate, M.P. 93–95° C.,
1-[3-(4-fluorobenzoyl)propyl]-4-piperidyl N - 4 - nitrophenylcarbamate, M.P. 154–155° C.,
1-[3-(4-fluorobenzoyl)propyl]-4-piperidyl N-2,4 - dichlorophenylcarbamate,
1-[3-(4-fluorobenzoyl)propyl]-4-piperidyl N - 4 - bromopenylcarbamate,
1-[3-(4-fluorobenzoyl)propyl]-4-piperidyl N - 4 - fluorophenylcarbamate,
1-[3-(4-fluorobenzoyl)propyl]-4-piperidyl N - 4 - trifluoromethylphenylcarbamate,
1-[3-(4-fluorobenzoyl)propyl]-4-piperidyl N - 3 - phenylphenylcarbamate,
1-[3-(4-fluorobenzoyl)propyl]-4-piperidyl N-4 - phenoxyphenylcarbamate,
1-[3-(4-fluorobenzoyl)propyl]-4-piperidyl N - 4 - benzylphenylcarbamate,
1-[3-(4-fluorobenzoyl)propyl]-4-piperidyl N - 2 - iodophenylcarbamate,
1-[3-(4-fluorobenzoyl)propyl]-4-piperidyl N - 2 - chloro-4-methylphenylcarbamate,
1-[3-(4-fluorobenzoyl)propyl]-4-piperidyl N-2,4,6-trichlorophenylcarbamate,
1-[3-(4-fluorobenzoyl)propyl]-4-piperidyl N-4 - dimethylaminophenylcarbamate,
1-[3-(4-fluorobenzoyl)propyl]-4-piperidyl N-3 - trifluoromethylphenylcarbamate,
1-[3-(4-fluorobenzoyl)propyl]-4-piperidyl N-2 - trifluoromethylphenylcarbamate,
1-[3-(4-fluorobenzoyl)propyl]-4-piperidyl N-3,5-dimethylphenylcarbamate, and
1-[3-(4-fluorobenzoyl)propyl]-4-piperidyl N - 4 - ethylphenylcarbamate, respectively.

EXAMPLE 18

When, in the procedure of Example 8, methylamine is replaced by 0.0137 mole of ethylamine,
isopropylamine,
t-butylamine,
cyclohexylamine,
propargylamine,
norbornylamine,
benzylamine,
phenethylamine,
$\beta,\beta$-dimethylphenethylamine,
1-adamantylamine,
4-(2-methoxyphenyl)piperazine,
3,4,5-trimethoxyphenethylamine,
cyclopropylamine,
cyclobutylamine,
cyclopentylamine,
cycloheptylamine,
4-chlorophenethylamine,
4-trifluoromethylbenzylamine,
2,4-dichlorobenzylamine,
pyrrolidine,
nortropine,
norpseudotropine,
4-methylpiperazine,
4-phenylpiperazine,
4-hydroxypiperidine and
1,2,3,6-tetrahydropyridine there are obtained, 1-[3-(4-fluorobenzoyl)propyl]-4-piperidyl N-ethylcarbamate, M.P. 97–98° C.,
1-[3-(4-fluorobenzoyl)propyl]-4-piperidyl N-isopropylcarbamate, M.P. 98–99° C.,
1-[3-(4-fluorobenzoyl)propyl]-4-piperidyl N-t-butylcarbamate, M.P. 111–113° C.,
1-[3-(4-fluorobenzoyl)propyl]-4-piperidyl N-cyclohexylcarbamate, M.P. 121–123° C.,
1-[3-(4-fluorobenzoyl)propyl]-4-piperidyl N-propargylcarbamate, M.P. 119–120° C.,
1-[3-(4-fluorobenzoyl)propyl]-4-piperidyl N-norbornylcarbamate, M.P. 131–133° C., 1-[3-(4-fluorobenzoyl)propyl]-4-piperidyl
  N-benzylcarbamate hydrochloride, M.P. 159–160 C.,
1-[3-(4-fluorobenzoyl)propyl]-4-piperidyl
  N-phenethylcarbamate, M.P. 105–106° C.,
1-[3-(4-fluorobenzoyl)propyl]-4-piperidyl
  N-β,β-dimethylphenethylcarbamate hydrochloride,
  M.P. 197–198° C.,
1-[3-(4-fluorobenzoyl)propyl]-4-piperidyl
  N-1-adamantylcarbamate, M.P. 119–121° C.,
1-{1-[3-(4-fluorobenzoyl)propyl]-4-piperidyloxycar-
  bonyl}-4-(2-methoxyphenyl)piperizine, B.P. 240°/0.2
  mm.,
1-[3-(4-fluorobenzoyl)propyl]-4-piperidyl
  N-3,4,5-trimethoxyphenylcarbamate, M.P. 78–79° C.,
1-[3-(4-fluorobenzoyl)propyl]-4-piperidyl
  N-cyclopropylcarbamate,
1-[3-(4-fluorobenzoyl)propyl]-4-piperidyl
  N-cyclobutylcarbamate,
1-[3-(4-fluorobenzoyl)propyl]-4-piperidyl
  N-cyclopentylcarbamate,
1-[3-(4-fluorobenzoyl)propyl]-4-piperidyl
  N-cycloheptylcarbamate,
1-[3-(4-fluorobenzoyl)propyl]-4-piperidyl
  N-4-chlorophenethylcarbamate,
1-[3-(4-fluorobenzoyl)propyl]-4-piperidyl
  N-4-trifluoromethylbenzylcarbamate,
1-[3-(4-fluorobenzoyl)propyl]-4-piperidyl
  N-2,4-dichlorobenzylcarbamate,
1{1-[3-(4-fluorobenzoyl)propyl]-4-piperidyloxycar-
  bonyl}pyrrolidine,
N-{1-[3-(4-fluorobenzoyl)propyl]-4-piperidyloxycar-
  bonyl}nortropine.
N-{1-[3-(4-fluorobenzoyl)propyl]-4-piperidyloxycar-
  bonyl}norpseudotropine,
1{1-[3-(4-fluorobenzoyl)propyl]-4-piperidyloxycar-
  bonyl}-4-methylpiperazine,
1{1-[3-(4-fluorobenzoyl)propyl]-4-piperidyloxycar-
  bonyl}-4-phenylpiperazine,
1{1-[3-(4-fluorobenzoyl)propyl]-4-piperidyloxycar-
  bonyl}-4-hydroxypiperidine, and
1{1-[3-(4-fluorobenzoyl)propyl]-4-piperidyloxycar-
  bonyl}-1,2,3,6-tetrahydropyridine, respectively.

EXAMPLE 19

When, in the procedure of Example 5, ammonia is replaced by 0.0271 mole of phenylamine,
methylamine,
1-naphthylamine,
2-naphthylamine,
allylamine,
3-chlorophenylamine,
4-methoxyphenylamine,
2-nitrophenylamine,
n-butylamine,
piperidine,
morpholine,
3-methylphenylamine,
2-chlorophenylamine,
4-chlorophenylamine,
4-ethoxyphenylamine,
3,4,5-trimethoxyphenylamine,
4-nitrophenylamine,
2,4-dichlorophenylamine,
4-bromophenylamine,
4-fluorophenylamine,
4-trifluoromethylphenylamine,
3-phenylphenylamine,
4-phenoxyphenylamine,
4-benzylphenylamine,
2-iodophenylamine,
2-chloro-4-methylphenylamine,
2,4,6-trichlorophenylamine,
4-dimethylaminophenylamine,
3-trifluoromethylphenylamine,
2-trifluoromethylphenylamine,
3,5-dimethylphenylamine,
4-ethylphenylamine,
ethylamine,
isopropylamine,
t-butylamine,
cyclohexylamine,
propargylamine,
norbornylamine,
benzylamine,
phenethylamine,
β,β-dimethylphenethylamine,
1-adamantylamine,
4-(2-methoxyphenyl)piperazine,
3,4,5-trimethoxyphenethylamine,
cyclopropylamine,
cyclobutylamine,
cyclopentylamine,
cycloheptylamine,
4-chlorophenethylamine,
4-trifluoromethylbenzylamine,
2,4-dichlorobenzylamine,
pyrrolidine,
nortropine,
norpseudotropine,
4-methylpiperazine,
4-phenylpiperazine,
4-hydroxypiperidine and
1,2,3,6-tetrahydropyridine,
there are obtained.

1-[1,1-ethylenedioxy-1-(4-fluorophenyl)-4-butyl]-
  4-piperidyl N-phenylcarbamate, M.P. 96–97° C.,
1-[1,1-ethylenedioxy-1-(4-fluorophenyl)-4-butyl]-
  4-piperidyl N-methylcarbamate,
1-[1,1-ethylenedioxy-1-(4-fluorophenyl)-4-butyl]-
  4-piperidyl N-1-naphthaylcarbamate,
1-[1,1-ethylenedioxy-1-(4-fluorophenyl)-4-butyl]-
  4-piperidyl N-2-naphthylcarbamate,
1-[1,1-ethylenedioxy-1-(4-fluorophenyl)-4-butyl]-
  4-piperidyl N-allylcarbamate,
1-[1,1-ethylenedioxy-1-(4-fluorophenyl)-4-butyl]-
  4-piperidyl N-3-chlorophenylcarbamate,
1-[1,1-ethylenedioxy-1-(4-fluorophenyl)-4-butyl]-
  4-piperidyl N-4-methoxyphenylcarbamate,
1-[1,1-ethylenedioxy-1-(4-fluorophenyl)-4-butyl]-
  4-piperidyl N-2-nitrophenylcarbamate,
1-[1,1-ethylenedioxy-1-(4-fluorophenyl)-4-butyl]-
  4-piperidyl N-butylcarbamate,
1-{1-[1,1-ethylenedioxy-1-(4-fluorophenyl)-4-butyl]-
  4-piperidyloxy-carbonyl}piperidine,
4-{1-[1,1-ethylenedioxy-1-(4-fluorophenyl)-4-butyl]-
  4-piperidyloxycarbonyl}morpholine,
1-[1,1-ethylenedioxy-1-(4-fluorophenyl)-4-butyl]-
  4-piperidyl N-3-methylphenylcarbamate,
1-[1,1-ethylenedioxy-1-(4-fluorophenyl)-4-butyl]-
  4-piperidyl N-2-chlorophenylcarbamate,
1-[1,1-ethylenedioxy-1-(4-fluorophenyl)-4-butyl]-
  4-piperidyl N-4-chlorophenylcarbamate,
1-[1,1-ethylenedioxy-1-(4-fluorophenyl)-4-butyl]-
  4-piperidyl N-4-ethoxyphenylcarbamate,
1-[1,1-ethylenedioxy-1-(4-fluorophenyl)-4-butyl]-
  4-piperidyl N-3,4,5-trimethoxyphenylcarbamate,
1-[1,1-ethylenedioxy-1-(4-fluorophenyl)-4-butyl]-
  4-piperidyl N-4-nitrophenylcarbamate,
1-[1,1-ethylenedioxy-1-(4-fluorophenyl)-4-butyl]-
  4-piperidyl N-2,4-dichlorophenylcarbamate,
1-[1,1-ethylenedioxy-1-(4-fluorophenyl)-4-butyl]-
  4-piperidyl N-4-bromophenylcarbamate,
1-[1,1-ethylenedioxy-1-(4-fluorophenyl)-4-butyl]-
  4-piperidyl N-4-fluorophenylcarbamate,
1-[1,1-ethylenedioxy-1-(4-fluorophenyl)-4-butyl]-
  4-piperidyl N-4-trifluoromethylphenylcarbamate,
1-[1,1-ethylenedioxy-1-(4-fluorophenyl)-4-butyl]-

4-piperidyl N-3-phenylphenylcarbamate,
1-[1,1-ethylenedioxy-1-(4-fluorophenyl)-4-butyl]-
 4-piperidyl N-4-phenoxyphenylcarbamate,
1-[1,1-ethylenedioxy-1-(4-fluorophenyl)-4-butyl]-
 4-piperidyl N-4-benzylphenylcarbamate,
1-[1,1-ethylenedioxy-1-(4-fluorophenyl)-4-butyl]-
 4-piperidyl N-2-iodophenylcarbamate,
1-[1,1-ethylenedioxy-1-(4-fluorophenyl)-4-butyl]-
 4-piperidyl N-2-chloro-4-methylphenylcarbamate,
1-[1,1-ethylenedioxy-1-(4-fluorophenyl)-4-butyl]-
 4-piperidyl N-2,4,6-trichlorophenylcarbamate,
1-[1,1-ethylenedioxy-1-(4-fluorophenyl)-4-butyl]-
 4-piperidyl N-4-dimethylaminophenylcarbamate,
1-[1,1-ethylenedioxy-1-(4-fluorophenyl)-4-butyl]-
 4-piperidyl N-3-trifluoromethylphenylcarbamate,
1-[1,1-ethylenedioxy-1-(4-fluorophenyl)-4-butyl]-
 4-piperidyl N-2-trifluoromethylphenylcarbamate,
1-[1,1-ethylenedioxy-1-(4-fluorophenyl)-4-butyl]-
 4-piperidyl N-3,5-dimethylphenylcarbamate,
1-[1,1-ethylenedioxy-1-(4-fluorophenyl)-4-butyl]-
 4-piperidyl N-4-ethylphenylcarbamate,
1-[1,1-ethylenedioxy-1-(4-fluorophenyl)-4-butyl]-
 4-piperidyl N-ethylcarbamate,
1-[1,1-ethylenedioxy-1-(4-fluorophenyl)-4-butyl]-
 4-piperidyl N-isopropylcarbamate,
1-[1,1-ethylenedioxy-1-(4-fluorophenyl)-4-butyl]-
 4-piperidyl N-t-butylcarbamate,
1-[1,1-ethylenedioxy-1-(4-fluorophenyl)-4-butyl]-
 4-piperidyl N-cyclohexylcarbamate,
1-[1,1-ethylenedioxy-1-(4-fluorophenyl)-4-butyl]-
 4-piperidyl N-propargylcarbamate,
1-[1,1-ethylenedioxy-1-(4-fluorophenyl)-4-butyl]-
 4-piperidyl N-norbornylcarbamate,
1-[1,1-ethylenedioxy-1-(4-fluorophenyl)-4-butyl]-
 4-piperidyl N-benzylcarbamate,
1-[1,1-ethylenedioxy-1-(4-fluorophenyl)-4-butyl]-
 4-piperidyl N-phenethylcarbamate,
1-[1,1-ethylenedioxy-1-(4-fluorophenyl)-4-butyl]-
 4-piperidyl N-$\beta,\beta$-dimethylphenethylcarbamate,
1-[1,1-ethylenedioxy-1-(4-fluorophenyl)-4-butyl]-
 4-piperidyl N-1-adamantylcarbamate,
1-{1-[1,1-ethylenedioxy-1-(4-fluorophenyl)-4-butyl]-
 4 - piperidyloxycarbonyl} - 4 - (2 - methoxyphenyl)
 piperazine,
1-[1,1-ethylenedioxy-1-(4-fluorophenyl)-4-butyl]-
 4-piperidyl N-3,4,5-trimethoxyphenylcarbamate,
1-[1,1-ethylenedioxy-1-(4-fluorophenyl)-4-butyl]-
 4-piperidyl N-cyclopropylcarbamate,
1-[1,1-ethylenedioxy-1-(4-fluorophenyl)-4-butyl]-
 4-piperidyl N-cyclobutylcarbamate,
1-[1,1-ethylenedioxy-1-(4-fluorophenyl)-4-butyl]-
 4-piperidyl N-cyclopentylcarbamate,
1-[1,1-ethylenedioxy-1-(4-fluorophenyl)-4-butyl]-
 4-piperidyl N-cycloheptylcarbamate,
1-[1,1-ethylenedioxy-1-(4-fluorophenyl)-4-butyl]-
 4-piperidyl N-4-chlorophenethylcarbamate,
1-[1,1-ethylenedioxy-1-(4-fluorophenyl)-4-butyl]-
 4-piperidyl N-4-trifluoromethylbenzylcarbamate,
1-[1,1-ethylenedioxy-1-(4-fluorophenyl)-4-butyl]-
 4-piperidyl N-2,4-dichlorobenzylcarbamate,
1-{1-[1,1-ethylenedioxy-1-(4-fluorophenyl)-4-butyl]-
 4-piperidyloxycarbonyl}pyrrolidine,
N-{1-[1,1-ethylenedioxy-1-(4-fluorophenyl)-4-butyl]-
 4-piperidyloxycarbonyl}nortropine,
N-{1-[1,1-ethylenedioxy-1-(4-fluorophenyl)-4-butyl]-
 4-piperidyloxycarbonyl}norpseudotropine,
1-{1-[1,1-ethylenedioxy-1-(4-fluorophenyl)-4-butyl]-
 4-piperidyloxycarbonyl}-4-methylpiperazine,
1-{1-[1,1-ethylenedioxy-1-(4-fluorophenyl)-4-butyl]-
 4-piperidyloxycarbonyl}-4-phenylpiperazine,
1-{1-[1,1-ethylenedioxy-1-(4-fluorophenyl) - 4 - butyl]-
 4-piperidyloxycarbonyl}-4-hydroxypiperidine, and
1-{1-[1,1-ethylenedioxy-1-(4-fluorophenyl) - 4 - butyl]-
 4-piperidyloxycarbonly}-1,2,3,6-tetrahydropyridine
respectively.

While this invention has been described in terms of its preferred embodiment, those skilled in the art will appreciate that modifications can be made without departing from the spirit and scope of the present invention.

What is claimed is:
1. A compound selected from the group consisting of compounds of the formula

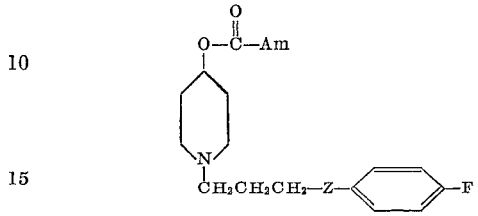

wherein Am is a member selected from the group consisting of amino, (lower)alkylamino, (lower)alkenylamino, (lower-alkylnylamino, cyclopropylamino, cyclobutylamino, cyclopentylamino, cyclohexylamino, cycloheptylamino, 2-norbornylamino, 3-quinuclidylamino, 1-adamantylamino, morpholino, pyrrolidino, nortropino, norpseudotropino, 4-(lower)alkylpiperazino, 4-phenylpiperazino, 4-(lower)alkoxyphenylpiperazino, piperidino, hydroxypiperidino, 1,2,3,6-tetrahydropyridino and a radical of the formula

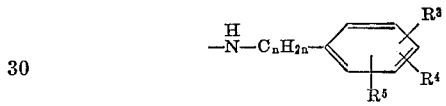

wherein $n$ is a whole integer from 0 to 5 and $R^3$, $R^4$ and $R^5$ each represent a member selected from the group consisting of hydrogen chloro, bromo, iodo, fluoro, trifluoromethyl, (lower)alkyl, (lower)alkoxy, di(lower)alkylamino, phenyl, phenoxy and benzyl, and Z is a radical selected from the group consisting of

and

and the pharmaceutically acceptable nontoxic salts thereof.

2. A compound of claim 1 having the formula

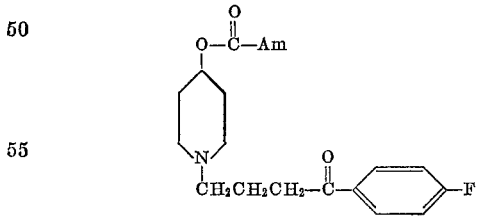

wherein Am is a member selected from the group consisting of amino, (lower)alkylamino, (lower)alkenylamino, (lower)alkynylamino, cyclopropylamino, cyclobutylamino, cyclopentylamino, cyclohexylamino, cycloheptylamino, 2-norbornylamino, 3-quinuclidylamino, 1-adamantylamino, morpholino, pyrrolidino, nortropino, norpseudotropino, 4-(lower)alkylpiperazino, 4-phenylpiperazino, 4-(lower)alkoxyphenylpiperazino, piperidino, hydroxypiperidino, 1,2,3,6-tetrahydropyridino, and a radical of the formula (IX)

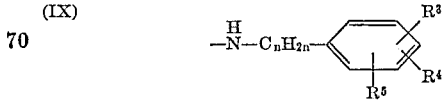

wherein $n$ is a whole integer from 0 to 5 and $R^3$, $R^4$ and $R^5$ each represent a member selected from the group conconsisting of hydrogen chloro, bromo, iodo, fluoro, trifluoromethyl, (lower)alkyl, (lower)alkoxy, di-(lower)alkylamino, phenyl, phenoxy and benzyl; and the pharmaceutically acceptable nontoxic salts thereof.

3. A compound of claim 1 having the formula

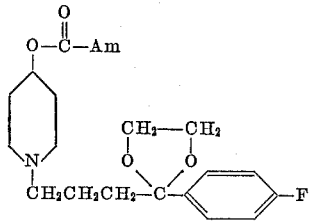

wherein Am is a member selected from the group consisting of amino, (lower)alkylamino, (lower)alkenylamino, (lower)alkynylamino, cyclopropylamino, cyclobutylamino, cyclopentylamino, cyclohexylamino, cycloheptylamino, 2-norbornylamino, 3-quinuclidylamino, 1-adamantylamino, morpholino, pyrrolidino, nortropino, norpseudotropino, 4-(lower)alkylpiperazino, 4-phenylpiperazino, 4-(lower)alkoxyphenylpiperazino, piperidino, hydroxypiperidino, 1,2,3,6-tetrahydropyridino, and a radical of the formula

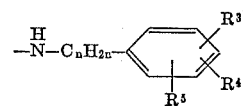

wherein $n$ is a whole integer from 0 to 5 and $R^3$, $R^4$ and $R^5$ each represent a member selected from the group consisting of hydrogen chloro, bromo, iodo, fluoro, trifluoromethyl, (lower)alkyl, (lower)alkoxy, di-(lower)alkylamino, phenyl, phenoxy and benzyl; and the pharmaceutically acceptable nontoxic salts thereof.

4. A compound of claim 1 having the formula

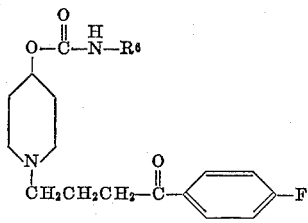

wherein $R^6$ is a member selected from the group consisting of hydrogen and (lower)alkyl; and the pharmaceutically acceptable nontoxic salts thereof.

5. A compound of claim 1 having the formula

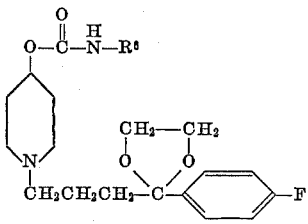

wherein $R^6$ is a member selected from the group consisting of hydrogen and (lower)alkyl; and the pharmaceutically acceptable nontoxic salts thereof.

6. The compound of claim 1 having the formula

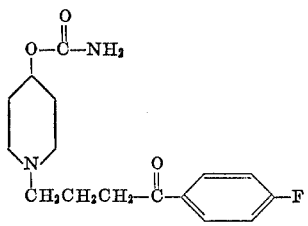

7. The pharmaceutically acceptable nontoxic salts of the compound of claim 6.

8. The compound of claim 1 having the formula

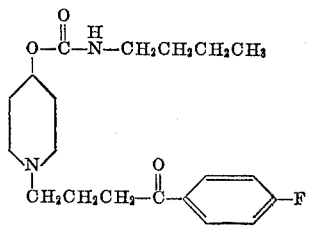

9. The pharmaceutically acceptable nontoxic salts of the compound of claim 8.

10. The compound of claim 1 having the formula

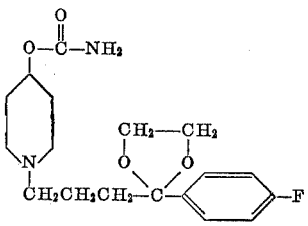

11. The compound of claim 1 having the formula

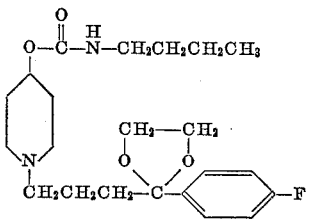

12. The compound of claim 1 having the formula

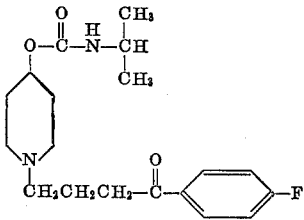

13. The compound of claim 1 having the formula

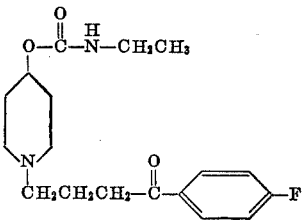

14. The compound of claim 1 having the formula

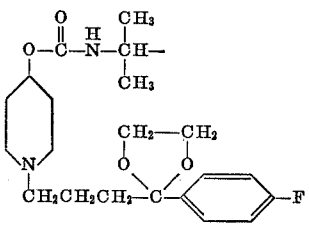

15. The compound of claim 1 having the formula
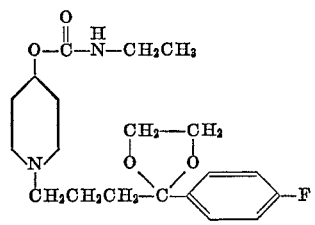
References Cited
UNITED STATES PATENTS
3,031,455  4/1962  Holysz _____ 260—294.3
3,161,637  12/1964  Janssen _____ 260—247.2
FOREIGN PATENTS
881,893  11/1961  Great Britain.
1,029,220  5/1966  Great Britain.
1,459  8/1962  France.
6,502,929  9/1965  Netherlands.
HENRY R. JILES, Primary Examiner
G. T. TODD, Assistant Examiner
U.S. Cl. X.R.
260—247.2, 268, 293.4, 294.7, 340.9, 999